US012350933B2

(12) United States Patent
Sasaki et al.

(10) Patent No.: US 12,350,933 B2
(45) Date of Patent: Jul. 8, 2025

(54) MEDIUM FEEDING DEVICE AND RECORDING APPARATUS

(71) Applicant: SEIKO EPSON CORPORATION, Tokyo (JP)

(72) Inventors: Keisuke Sasaki, Matsumoto (JP); Takayuki Tanaka, Matsumoto (JP); Hiroki Shinagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/612,250

(22) Filed: Mar. 21, 2024

(65) Prior Publication Data

US 2024/0227392 A1 Jul. 11, 2024

Related U.S. Application Data

(63) Continuation of application No. 17/128,619, filed on Dec. 21, 2020, now Pat. No. 11,964,479.

(30) Foreign Application Priority Data

Dec. 23, 2019 (JP) ................................ 2019-231080

(51) Int. Cl.
*B41J 2/045* (2006.01)
*B41J 13/10* (2006.01)

(52) U.S. Cl.
CPC ....... *B41J 2/04581* (2013.01); *B41J 2/04588* (2013.01); *B41J 13/10* (2013.01)

(58) Field of Classification Search
CPC ..... B41J 2/04581; B41J 2/04588; B41J 13/10
See application file for complete search history.

(56) References Cited

U.S. PATENT DOCUMENTS

| | | | |
|---|---|---|---|
| 6,129,461 A | 10/2000 | Nakai | |
| 2014/0292986 A1 | 10/2014 | Oki et al. | |
| 2016/0124687 A1 | 5/2016 | Shinagawa et al. | |

FOREIGN PATENT DOCUMENTS

| | | |
|---|---|---|
| CN | 105564048 | 5/2016 |
| JP | H05-162871 A | 6/1993 |
| JP | 2013173251 A * | 9/2013 |
| JP | 2014-208428 A | 11/2014 |
| JP | 2016-185610 | 10/2016 |

* cited by examiner

*Primary Examiner* — Lam S Nguyen
(74) *Attorney, Agent, or Firm* — WORKMAN NYDEGGER

(57) ABSTRACT

A medium feeding device includes a feeding roller that is provided in a medium feeding path through which a medium is fed and that feeds a medium downstream by rotating in the forward direction in response to power of a motor, a nip roller that is provided in the medium feeding path and that nips a medium in cooperation with the feeding roller and rotates, and a controller configured to control the motor. Based on an increase in a variation value varying in accordance with a drive load of the motor, the controller controls the motor and causes the feeding roller to start a medium feeding operation.

7 Claims, 8 Drawing Sheets

MEDIUM FEEDING DEVICE AND RECORDING APPARATUS

The present application is a continuation of U.S. application Ser. No. 17/128,619, filed Dec. 21, 2020, which is based on, and claims priority from JP Application Serial Number 2019-231080, filed Dec. 23, 2019, the disclosures of which are hereby incorporated by reference herein in their entirety.

BACKGROUND

1. Technical Field

The present disclosure relates to a medium feeding device configured to feed a medium and a recording apparatus including the medium feeding device.

2. Related Art

A recording apparatus such as a facsimile or a printer is, in some cases, configured to manually feed recording paper, which is an example of a medium, into the apparatus. Moreover, as JP-A-5-162871 discloses, in some cases, such a recording apparatus of the related art configured to perform manual feeding includes a detection unit used to detect that recording paper is set in a manual feeding tray, and, when the detection unit detects that recording paper is set in the manual feeding tray, the recording apparatus shifts to a manual feeding mode.

When operating the recording apparatus having such an above-described mechanism, a user may take their hand off the recording paper in a state in which the leading end of the recording paper that has been set by the user reaches a detection position of the detection unit but does not reach a paper feeding roller. The recording apparatus of the related art determines that the recording paper is properly set even in such a case and starts a feeding operation in a state in which the recording paper does not reach the paper feeding roller.

The recording apparatus then determines such a condition as a feeding anomaly based on the fact that a detection unit provided further downstream than the paper feeding roller has not detected the leading end of the recording paper for a predetermined time. As a result, the recording apparatus cannot determine whether the cause of the feeding anomaly is a recording paper setting error or a jam after feeding starts and cannot issue an appropriate alert. Thus, user convenience may be decreased.

SUMMARY

According to an aspect of the present disclosure, a medium feeding device includes a feeding roller that is provided in a medium feeding path through which a medium is fed and that feeds a medium downstream by rotating in a forward direction in response to power of a motor, a nip roller that is provided in the medium feeding path and that nips a medium in cooperation with the feeding roller and rotates, and a controller configured to control the motor. Based on an increase in a variation value varying in accordance with a drive load of the motor, the controller controls the motor and causes the feeding roller to start a medium feeding operation.

According to an aspect of the present disclosure, a recording apparatus includes a recording head configured to perform recording on a medium, and the medium feeding device configured to feed a medium toward a region facing the recording head.

DESCRIPTION OF EXEMPLARY EMBODIMENTS

Figure 1:
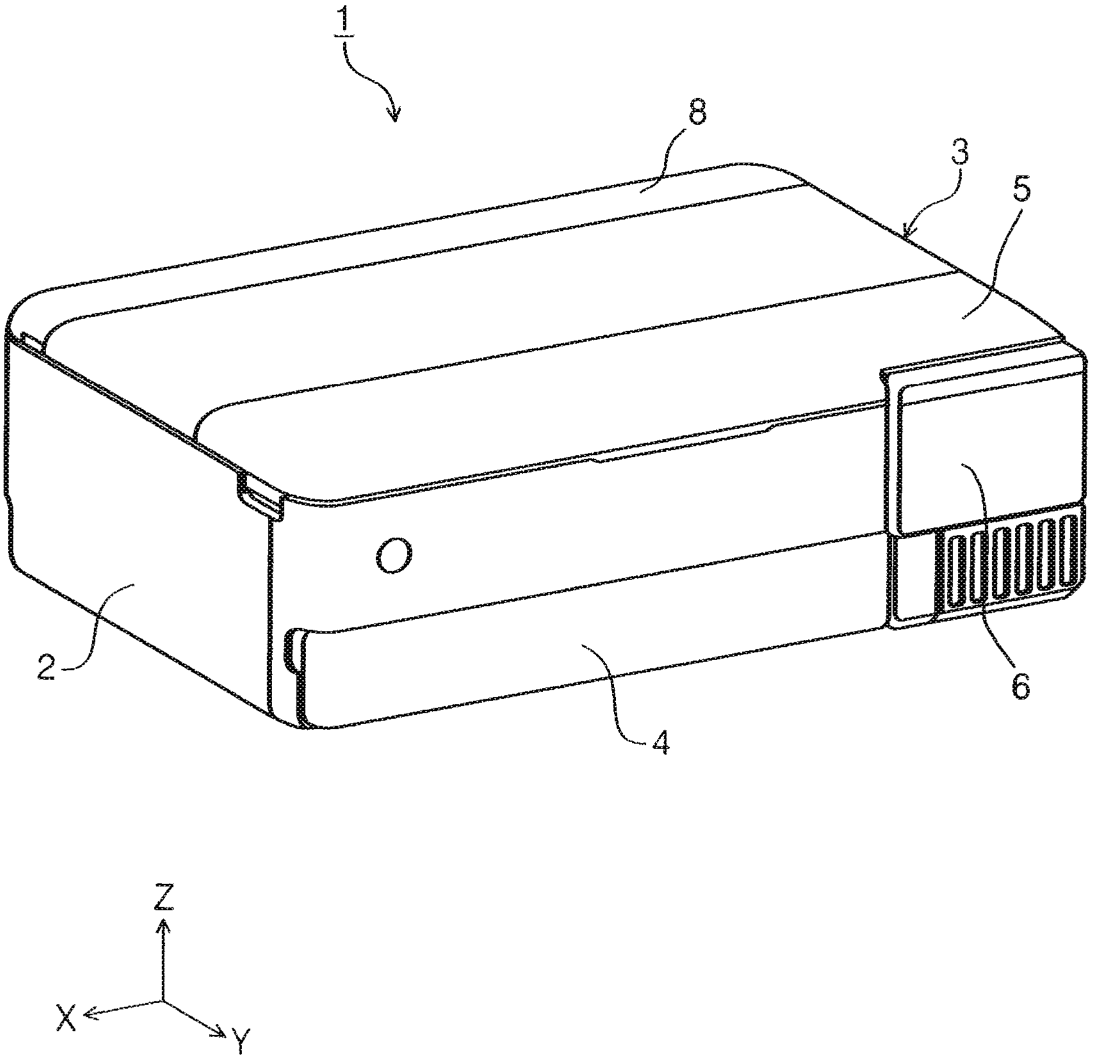
FIG. 1 is a perspective view of a printer according to the present disclosure as viewed from the front.

Hereinafter, the present disclosure will be schematically described.

A medium feeding device according to a first aspect includes a feeding roller that is provided in a medium feeding path through which a medium is fed and that feeds a medium downstream by rotating in a forward direction in response to power of a motor, a nip roller that is provided in the medium feeding path and that nips a medium in cooperation with the feeding roller and rotates, and a controller configured to control the motor. Based on an increase in a variation value varying in accordance with a drive load of the motor, the controller controls the motor and causes the feeding roller to start a medium feeding operation.

When the leading end of a medium enters between the feeding roller and the nip roller, the variation value varying in accordance with the drive load of the motor changes, and it is thereby possible to detect that the leading end of the medium enters between the feeding roller and the nip roller. The present aspect utilizes such a property. The controller controls the motor and causes the feeding roller to start the medium feeding operation based on an increase in the variation value varying in accordance with the drive load of the motor, and it is thereby possible to suppress a feeding operation from being started in a state in which a medium setting error occurs. As a result, when a feeding anomaly occurs after the feeding operation of a medium is started, it is possible to issue a user an appropriate alert. Thus, user convenience can be improved.

According to a second aspect, in the medium feeding device according to the first aspect, the controller emits a notification sound when an increase in the variation value exceeds a threshold value.

According to the present aspect, when the variation value exceeds the threshold value, the controller emits the notification sound, and it is thereby possible for a user to know that a medium is nipped by the feeding roller and the nip roller, due to the notification sound. Thus, user convenience is improved.

According to a third aspect, the medium feeding device according to the first or second aspect further includes, a medium detection portion that is provided upstream of the feeding roller in the medium feeding path and that detects passage of a medium. When the medium detection portion detects passage of a leading end of a medium, the controller controls the motor to rotate the feeding roller in a reverse direction that is opposite to the forward direction, and, when detecting an increase in the variation value with the feeding roller being rotated in the reverse direction, the controller changes a driving direction of the motor and starts the medium feeding operation.

According to the present aspect, when the medium detection portion detects passage of the leading end of a medium, the controller controls the motor to rotate the feeding roller in the reverse direction that is opposite to the forward direction, and a change in the drive current value when the leading end of the medium is entering between the feeding roller and the nip roller thereby becomes noticeable. Thus, it is possible to detect with greater certainty that the leading end of the medium reaches between the feeding roller and the nip roller.

According to a fourth aspect, in the medium feeding device according to the third aspect, a rotational speed of the feeding roller when the feeding roller is rotated in the reverse direction is lower than the rotational speed of the feeding roller when the feeding roller is rotated in the forward direction in the medium feeding operation.

According to the present aspect, the rotational speed of the feeding roller when the feeding roller is rotated in the reverse direction is lower than the rotational speed of the feeding roller when the feeding roller is rotated in the forward direction in the medium feeding operation, and it is thereby possible to suppress damage to the leading end of a medium when the leading end of the medium enters between the feeding roller and the nip roller from being caused.

According to a fifth aspect, the medium feeding device according to the first or second aspect further includes a medium detection portion that is provided upstream of the feeding roller in the medium feeding path and that detects passage of a medium. When not detecting an increase in the variation value, even if a predetermined time elapses from the medium detection portion detecting passage of a leading end of a medium, the controller emits an alert prompting insertion of the medium.

According to the present aspect, when not detecting an increase in the drive current value, even if a predetermined time elapses from the medium detection portion detecting passage of the leading end of the medium, the controller emits the alert prompting insertion of the medium. Thus, it is possible to encourage a user to take appropriate action, and, by extension, user convenience is improved.

According to a sixth aspect, a recording apparatus includes a recording head configured to perform recording on a medium, and the medium feeding device according to any one of the first to fifth aspects, the medium feeding device feeding a medium toward a region facing the recording head.

According to the present aspect, in the recording apparatus, it is possible to obtain the operational effect of the above-described any one of the first to fifth aspects.

According to a seventh aspect, the recording apparatus according to the sixth aspect further includes a medium supporting portion that is provided at a position facing the recording head, that supports a medium, and that is configured so that a gap between the medium supporting portion and the recording head is adjusted under control of the controller. When detecting an increase in the variation value, the controller widens the gap between the medium supporting portion and the recording head.

According to the present aspect, when detecting an increase in the variation value, the controller widens the gap between the medium supporting portion and the recording head. Thus, when a thick medium is fed, it is possible to avoid the medium rubbing against the recording head and avoid damage to the recording head.

According to an eighth aspect, the recording apparatus according to the sixth aspect further includes: a reverse path configured to cause a side of a medium to be reversed by using a portion of the medium feeding path being a linear path extending horizontally from upstream to downstream, that is, from a rear of an apparatus main body having the recording head toward a front of the apparatus main body; and a reverse unit that is configured to be attached to and detached from the apparatus main body having the recording head, that constitutes a portion of the reverse path by being attached to the apparatus main body, and that causes a portion of the reverse path to be exposed by being detached from the apparatus main body. The medium feeding path is caused to be used by detaching the reverse unit from the apparatus main body.

According to a ninth aspect, the recording apparatus according to the eighth aspect further includes: a medium supporting portion that is provided at a position facing the recording head, that supports a medium, and that is configured so that a gap between the medium supporting portion and the recording head is adjusted under control of the controller; and a unit detection portion configured to detect an attachment state of the reverse unit with respect to the apparatus main body. When the unit detection portion detects detachment of the reverse unit from the apparatus main body, the controller widens the gap between the medium supporting portion and the recording head.

According to the present aspect, when the unit detection portion detects detachment of the reverse unit from the apparatus main body, the controller widens the gap between the medium supporting portion and the recording head. Thus, when a thick medium is fed, it is possible to avoid the medium rubbing against the recording head.

According to a tenth aspect, in the recording apparatus according to the seventh or ninth aspect, before the recording head starts a recording operation, the controller adjusts the gap between the medium supporting portion and the recording head in accordance with the variation value.

The variation value varies more widely as the thickness of the medium increases, and it is thereby possible to grasp the thickness of the medium based on the variation value. Based on such a property, in the present aspect, before the recording head starts the recording operation, the controller adjusts the gap between the medium supporting portion and the recording head in accordance with the variation value. Thus, appropriate recording quality can be achieved.

Hereinafter, the present disclosure will be described in detail.

Hereinafter, an ink jet printer 1 will be described as an example of a recording apparatus. Hereinafter, the ink jet printer 1 will simply be referred to as a printer 1.

Regarding the X-Y-Z coordinate system in each figure, the X-axis direction denotes a moving direction of a recording head 17 (refer to FIG. 2) and denotes the width direction of a medium to be subjected to recording. The X-axis direction also denotes the apparatus width direction. In a state of facing the printer 1, the +X direction is the leftward direction, and the −X direction is the rightward direction.

The Y-axis direction denotes the apparatus depth direction and a direction parallel to a medium feeding direction during recording. The +Y direction is a direction from the rear toward the front of the apparatus, and the −Y direction is a direction from the front toward the rear of the apparatus. In the present exemplary embodiment, out of side surfaces constituting the periphery of the printer 1, a side surface having an operation panel 6 is the front surface of the apparatus.

The Z-axis direction denotes a direction parallel to the vertical direction and the apparatus height direction. The +Z direction is the vertically upward direction, and the −Z direction is the vertically downward direction.

Hereinafter, a direction in which a medium is fed is sometimes referred to as "downstream", and a direction opposite thereto is sometimes referred to as "upstream".

First, the overall configuration of the printer 1 will be outlined. In FIG. 1, the printer 1 includes a scanner unit 3 provided at an upper portion of an apparatus main body 2 configured to perform ink jet recording on a medium. That is, the printer 1 is configured as a multi-function apparatus having, in addition to an ink jet recording function, a document reading function.

The scanner unit 3 is rotatably provided on the apparatus main body 2 and rotates to be in a closed state illustrated in FIG. 1 and in an open state, which is not illustrated.

The scanner unit 3 has a document cover 5 by which a document platen, which is not illustrated, is opened and closed.

In the front surface of the apparatus, the apparatus main body 2 has the operation panel 6 including components such as an operating portion used to set various operations and a display portion used to display, for example, contents of print settings and a preview of a print image.

Figure 2:
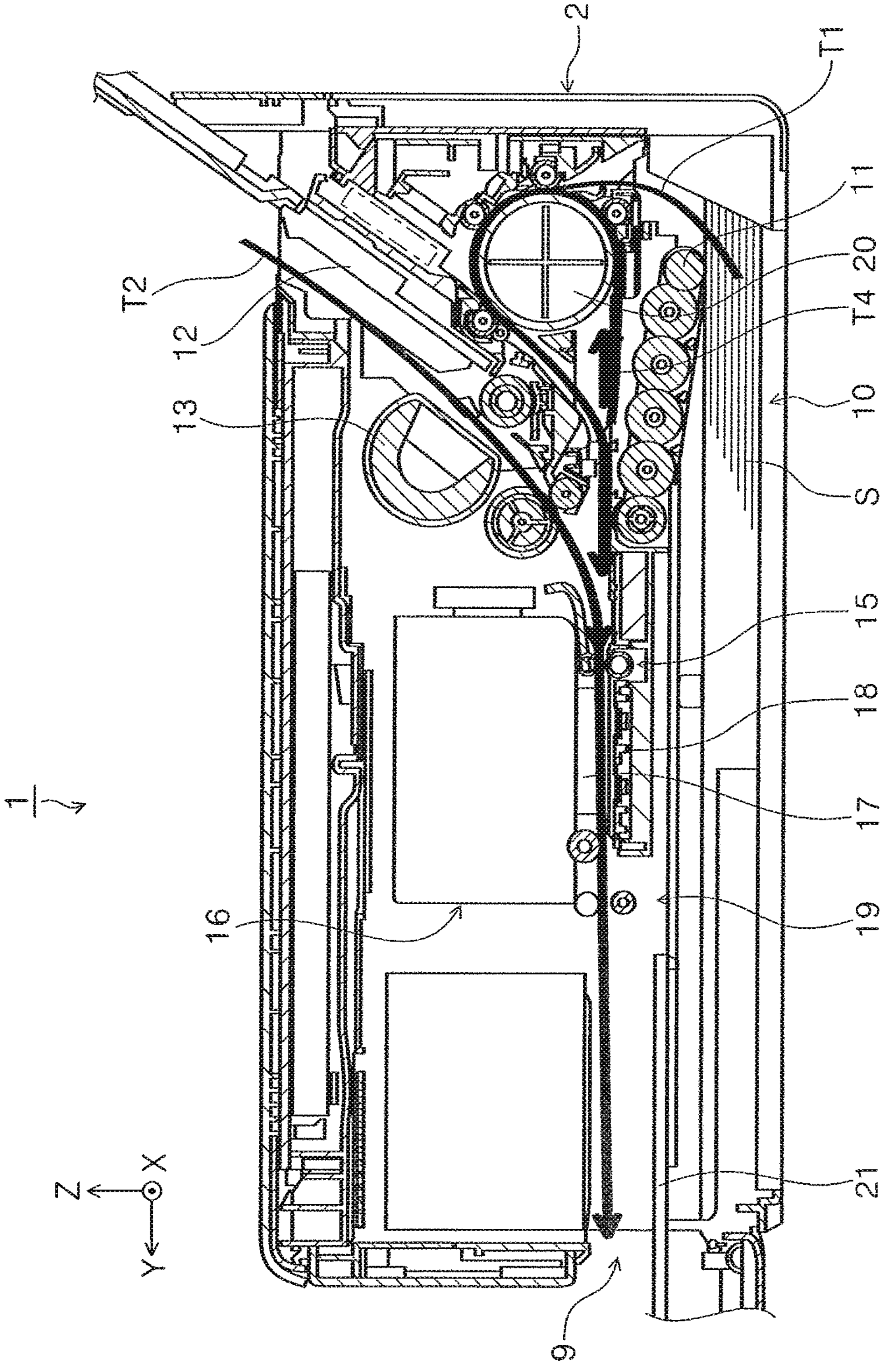
FIG. 2 illustrates an overall structure of medium feeding paths of the printer according to the present disclosure.

A front surface cover 4 is provided in the front surface of the apparatus, and, by the front surface cover 4 being opened, components such as a medium cassette 10, a medium discharge opening 9, and a medium receiving tray 21, which are illustrated in FIG. 2 but not in FIG. 1, are exposed.

An upper surface cover 8 is provided on the rear side of the upper surface of the apparatus, and, by the upper surface cover 8 being opened, an inclined supporting portion 12, which is illustrated in FIG. 2 but not in FIG. 1, is exposed.

Figure 3:
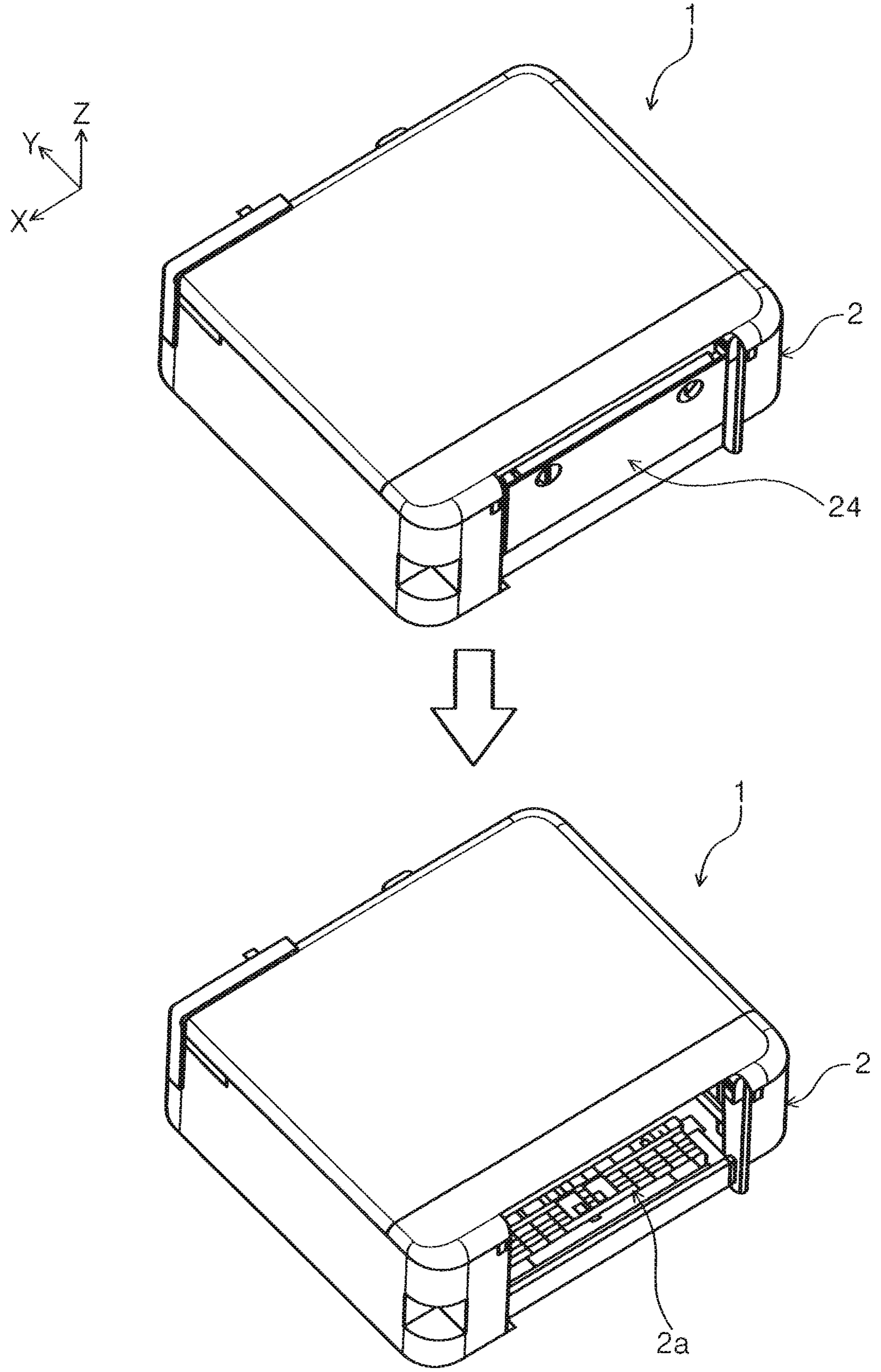
FIG. 3 is a perspective view of the printer according to the present disclosure as viewed from the rear.

Next, medium feeding paths of the printer 1 will be described with reference to FIGS. 2 to 4. As FIG. 2 illustrates, the printer 1 has four medium feeding paths that are a medium feeding path T1 from the medium cassette 10 provided in a lower portion of the apparatus, a medium feeding path T2 from the rear side of an upper portion of the apparatus, a medium feeding path T3 (refer to FIG. 4) from the rear of the apparatus, and a medium feeding path T4 through which a medium that has been subjected to recording is fed again toward a reverse roller 20. Each medium feeding path is made of a path forming member, and the detailed description thereof will be omitted.

In the medium feeding path T1, a medium is fed from the medium cassette 10 by a pick roller 11 and reversed and fed toward a feeding roller pair 15 by the reverse roller 20. Reference S in FIG. 2 denotes media set in the medium cassette 10.

In the medium feeding path T2, a medium supported by the inclined supporting portion 12 with the medium orientated in an inclined manner is fed toward the feeding roller pair 15 by a supply roller 13.

The medium feeding path T3 is a path for manually feeding a medium from the rear toward the front of the apparatus. Although described in detail below, in the present specification, the medium feeding path T3 is set to be a path from an adapter 23 (refer to FIG. 4), which will be described below, to the medium receiving tray 21. The medium feeding path T3 is a substantially linear path and is, in the present exemplary embodiment, a path extending in the horizontal direction.

Examples of a medium include a sheet material with flexibility, such as recording paper, and a plate-shaped body that hardly bends, such as an optical disc. Out of such examples, the plate-shaped body that hardly bends, such as an optical disc, is fed by using the medium feeding path T3. A medium that is small and not square, such as an optical disc, is fed into the medium feeding path T3 in a state of being set in a tray for such a medium.

Figure 5:
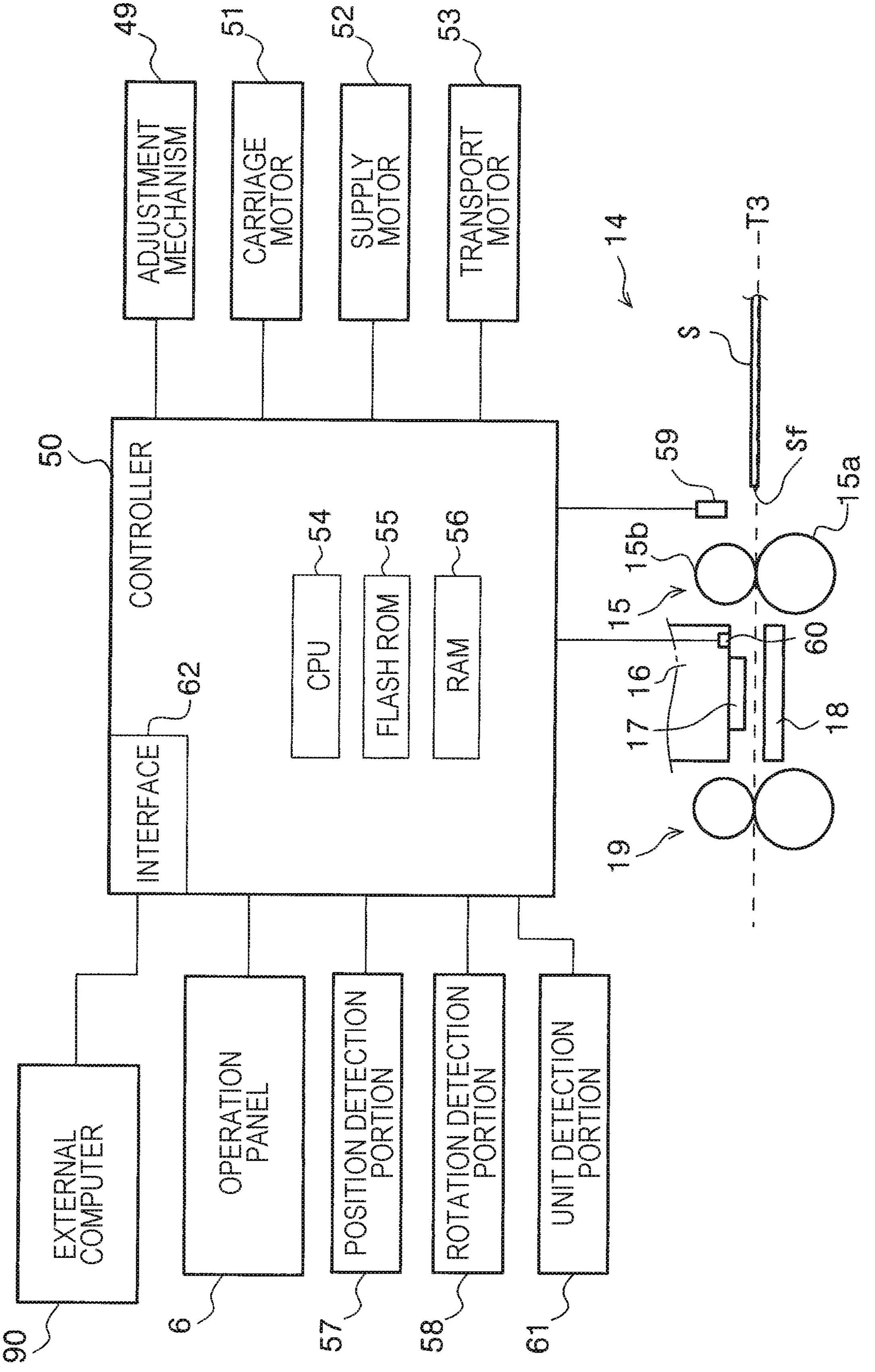
FIG. 5 is a block diagram of a control system of the printer according to the present disclosure.

As FIG. 5 illustrates, the feeding roller pair 15 configured to feed a medium to a position facing the recording head 17 is constituted by a feeding roller 15*a* and a nip roller 15*b*. The feeding roller 15*a* is configured to rotate in one of the forward direction (counterclockwise direction in FIGS. 2 and 5) in which the feeding roller 15*a* feeds a medium downstream in response to power from a transport motor 53, which will be described below, and the reverse direction (clockwise direction in FIGS. 2 and 5) in which the feeding roller 15*a* feeds a medium upstream. In the present exemplary embodiment, the feeding roller 15*a* includes a metal shaft body and a high friction layer provided on a surface of the metal shaft body.

The nip roller 15*b* is provided so as to be able to advance and retreat with respect to the feeding roller 15*a* and is pressed toward the feeding roller 15*a* by a spring, which is not illustrated, and, while nipping a medium in cooperation with the feeding roller 15*a*, the nip roller 15*b* is driven to rotate. Although an illustration is omitted, the nip roller 15*b* is constituted by a plurality of nip rollers provided in the axial direction of the feeding roller 15*a* at an appropriate interval. The nip roller 15*b* is made of a low friction material and, in the present exemplary embodiment, the nip roller 15*b* is made of Polyoxymethylene (POM).

The feeding roller 15*a* and the nip roller 15*b* constitute a medium feeding device 14.

Referring back to FIG. 2, the recording head 17 and a medium supporting portion 18 are disposed so as to face each other downstream of the feeding roller pair 15. The medium supporting portion 18 defines a gap between the recording head 17 and a medium by supporting the medium.

A carriage 16 having the recording head 17 is provided so as to be able to reciprocate in the medium width direction and moves in the X-axis direction in response to power from a carriage motor 51 (refer to FIG. 5) controlled by a controller 50 (refer to FIG. 5).

The carriage 16 is configured to be displaced in the Z-axis direction due to an adjustment mechanism 49 (refer to FIG. 5) controlled by the controller 50 (refer to FIG. 5), and the adjustment mechanism 49 is configured to adjust a gap between the recording head 17 and the medium supporting portion 18. The adjustment mechanism 49 can be constituted by, for example, a motor and a cam mechanism, which are not illustrated.

A discharge roller pair 19 is provided downstream of the recording head 17 and the medium supporting portion 18, and a medium that has been subjected to recording is discharged toward the outside of the apparatus by the discharge roller pair 19 and supported by the medium receiving tray 21.

When recording is performed on the both sides of a medium, after the recording head 17 performs recording on a first side of the medium, the medium is back-fed in the −Y direction to be fed into the medium feeding path T4 and reversed by the reverse roller 20. Thus, recording can be performed on a second side of the medium.

Next, the medium feeding path T3 will be described with reference to FIGS. 3 and 4. A reverse unit 24 is provided at the rear of the apparatus main body 2 so as to be attachable to and detachable from the apparatus main body 2. The reverse unit 24 includes the reverse roller 20. By the reverse unit 24 being detached from the apparatus main body 2 as illustrated by the change from the upper image in FIG. 3 to the lower image in FIG. 3, an opening 2*a* is formed at the rear of the apparatus main body 2 as the lower image of FIG. 3 illustrates. Due to the opening 2*a*, when a jam occurs in the apparatus main body 2, a medium that has been jammed can be removed.

Figure 4:
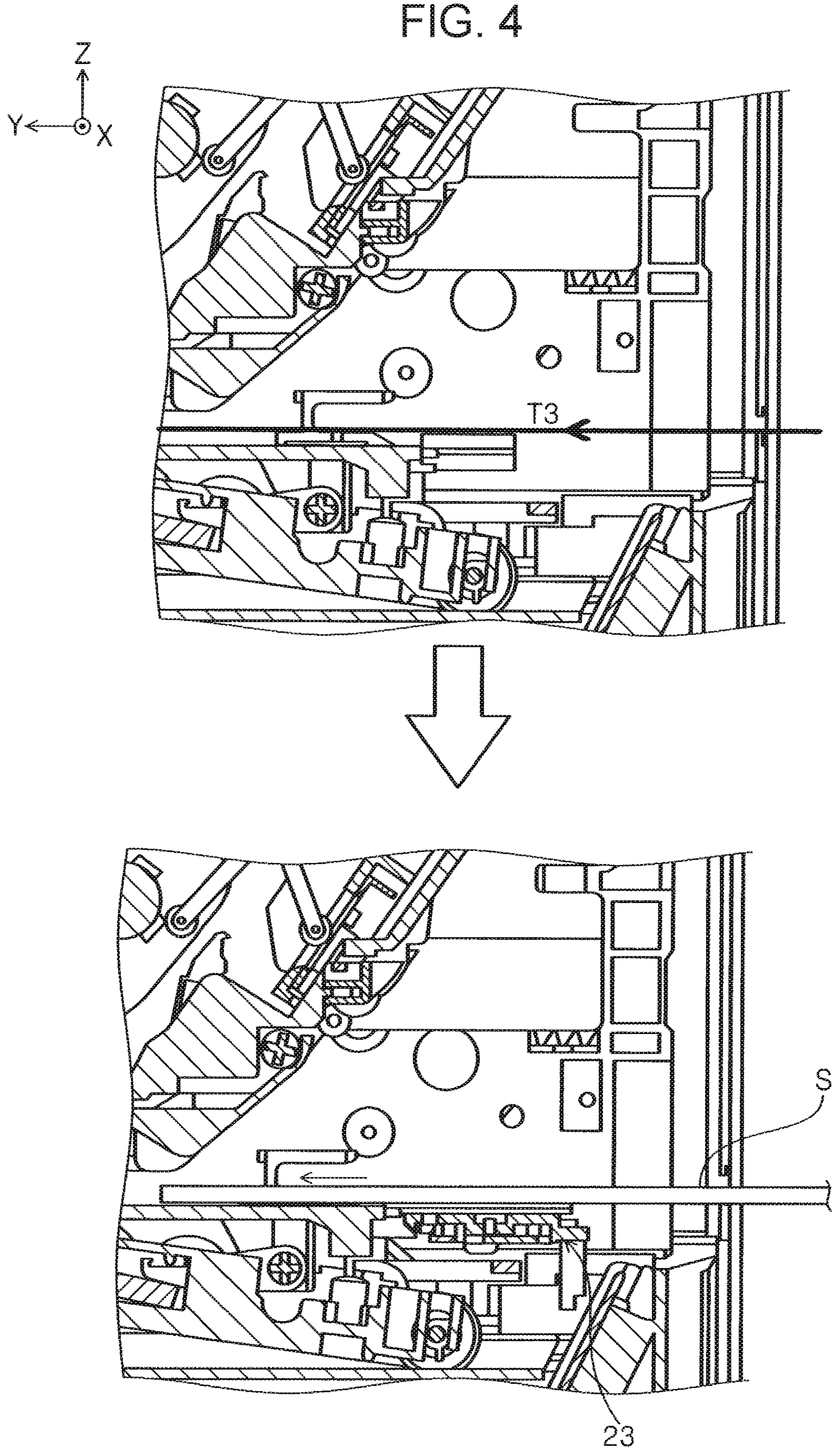
FIG. 4 illustrates a portion of the medium feeding path of the printer according to the present disclosure.

In addition, by the reverse unit 24 being detached from the apparatus main body 2, the medium feeding path T3 is exposed as the upper image of FIG. 4 illustrates, and the medium feeding path T3 becomes available.

As FIG. 2 illustrates, the adapter 23 is provided at an upper portion of the reverse unit 24. The adapter 23 is attachable to and detachable from the reverse unit 24. By the reverse unit 24 being detached from the apparatus main body 2, the adapter 23 can be attached to and detached from the reverse unit 24. The adapter 23 that has been detached from the reverse unit 24 can be attached to a region of the apparatus main body 2 to which the reverse unit 24 was attached as the lower image of FIG. 4 illustrates. A medium S to be fed through the medium feeding path T3 is supported by the attached adapter 23.

Next, a control system in the printer 1 will be described with reference to FIG. 5.

The controller 50 performs various controls of the printer 1, such as feeding, transporting, discharging and recording of a medium. The controller 50 is also a constituent of the medium feeding device 14. Signals from the operation panel 6 are input into the controller 50, and signals for display of the operation panel 6 and, in particular, for realization of a user interface (UI) are transmitted from the controller 50 to the operation panel 6.

The controller 50 controls motors relevant to a medium feeding operation and a recording operation, that is, the carriage motor 51, a supply motor 52, and the transport motor 53. In the present exemplary embodiment, each motor is a DC motor. The transport motor 53 constitutes the medium feeding device 14.

Detection signals from detection portions that are a position detection portion 57, a rotation detection portion 58, a first medium detection portion 59, a second medium detection portion 60, and a unit detection portion 61 are also input into the controller 50.

The position detection portion 57 is a linear encoder and is a detection portion configured to detect the position of the carriage 16 in the X-axis direction. The rotation detection portion 58 is a rotary encoder and is a detection portion configured to detect the amount of rotation and the rotational speed of the feeding roller 15*a*.

The unit detection portion 61 is a detection portion configured to detect whether the reverse unit 24 (refer to FIG. 3) is attached. The unit detection portion 61 can be constituted by a contact sensor or a noncontact sensor.

The first medium detection portion 59 is provided near and upstream of the feeding roller pair 15 and is a detection portion configured to detect passage of the leading end and the trailing end of a medium. In the carriage 16, the second medium detection portion 60 is provided at a position facing a medium and is used to detect the position of an end portion of a medium in the width direction thereof and, in some cases, to detect passage of the leading end and the trailing end of a medium. The second medium detection portion 60 can be constituted by a noncontact sensor, and the first medium detection portion 59 can be constituted by a contact sensor or a noncontact sensor.

In the present exemplary embodiment, the first medium detection portion 59, the second medium detection portion 60, and the unit detection portion 61 constitute the medium feeding device 14.

The controller 50 includes a CPU 54, a flash ROM 55, and a RAM 56. The CPU 54 performs various kinds of arithmetic processing in accordance with the program stored in the flash ROM 55 and controls operations of the entire printer 1. The flash ROM 55, which is an example of a memory unit, is a nonvolatile memory enabling reading and writing. Various kinds of setting information that have been input by a user by using the operation panel 6 are also recorded into the flash ROM 55. Various kinds of information are temporarily stored in the RAM 56, which is an example of a memory unit.

The controller 50 also includes an interface 62 and can communicate, via the interface 62, with an external computer 90.

Next, the control performed by the controller 50 when a medium is manually fed into the medium feeding path T3 will be described with reference to FIGS. 5 and 6 and subsequent figures. Hereinafter, a medium is referred to as a medium S, and the leading end of the medium S is referred to as a leading end Sf.

The controller 50 is configured to detect that the leading end Sf of the medium S enters the feeding roller pair 15, by referring a variation value varying in accordance with a drive load of the transport motor 53 and a threshold value with respect to the variation value. As the variation value, for example, a drive current value of the transport motor 53 can be used.

Figure 6:
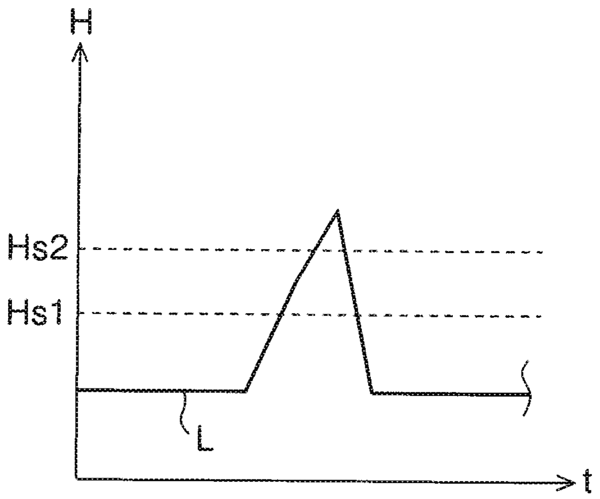
FIG. 6 illustrates a waveform example of a drive current value of a transport motor.

FIG. 6 illustrates an example of a waveform L of the drive current value of the transport motor 53, and the vertical axis denotes a drive current value H and the horizontal axis denotes time t. As the waveform L illustrates, when the leading end Sf of the medium S enters the feeding roller pair 15, the drive current value H of the transport motor 53 temporarily increases.

Thus, by setting a threshold value Hs1, it is possible to detect that the leading end Sf of the medium S enters the feeding roller pair 15. In addition, when a threshold value Hs2 is set, it is possible to detect whether the thickness of the medium S that has entered exceeds a predetermined thickness. Predetermined values such as the threshold values Hs1 and Hs2 are stored in the flash ROM 55 (refer to FIG. 5).

Figure 7:
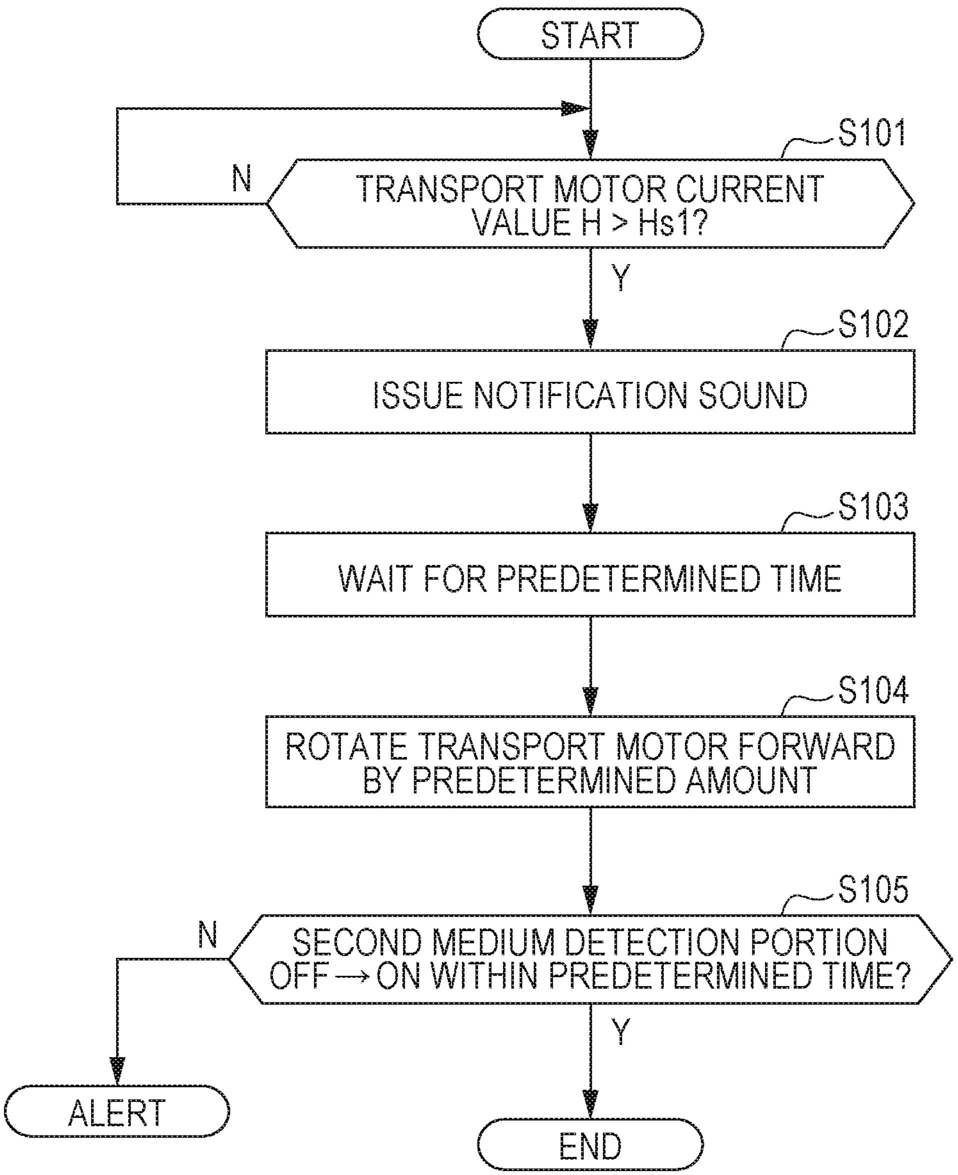
FIG. 7 is a flowchart of a first control example performed by a controller.

FIG. 7 illustrates a first control example performed by the controller 50. In FIG. 7, the controller 50 determines whether the drive current value H of the transport motor 53 exceeds the threshold value Hs1 (Step S101), and, when the drive current value H exceeds the threshold value Hs1 ("Yes" in Step S101), the controller 50 emits a notification sound (Step S102). The notification sound can be a short beep such as a "pip" sound. Thus, it is possible for a user to know that the leading end Sf of the medium S is nipped by the feeding roller pair 15. The notification sound can be issued from a speaker, which is not illustrated, provided in the operation panel 6 (refer to FIG. 1).

Next, the controller 50 waits for a predetermined time (Step S103), and, thereafter, the controller 50 positions the medium S at a printing start position by rotating the transport motor 53, that is, by rotating the feeding roller 15*a* forward by a predetermined amount (Step S104).

When the second medium detection portion 60 does not detect the leading end Sf of the medium S within a predetermined time ("No" in Step S105), the controller 50 causes the operation panel 6 to issue an alert. The alert in such a case can be, for example, an error massage such as "Paper is jammed. Remove the jammed paper".

Figure 8:
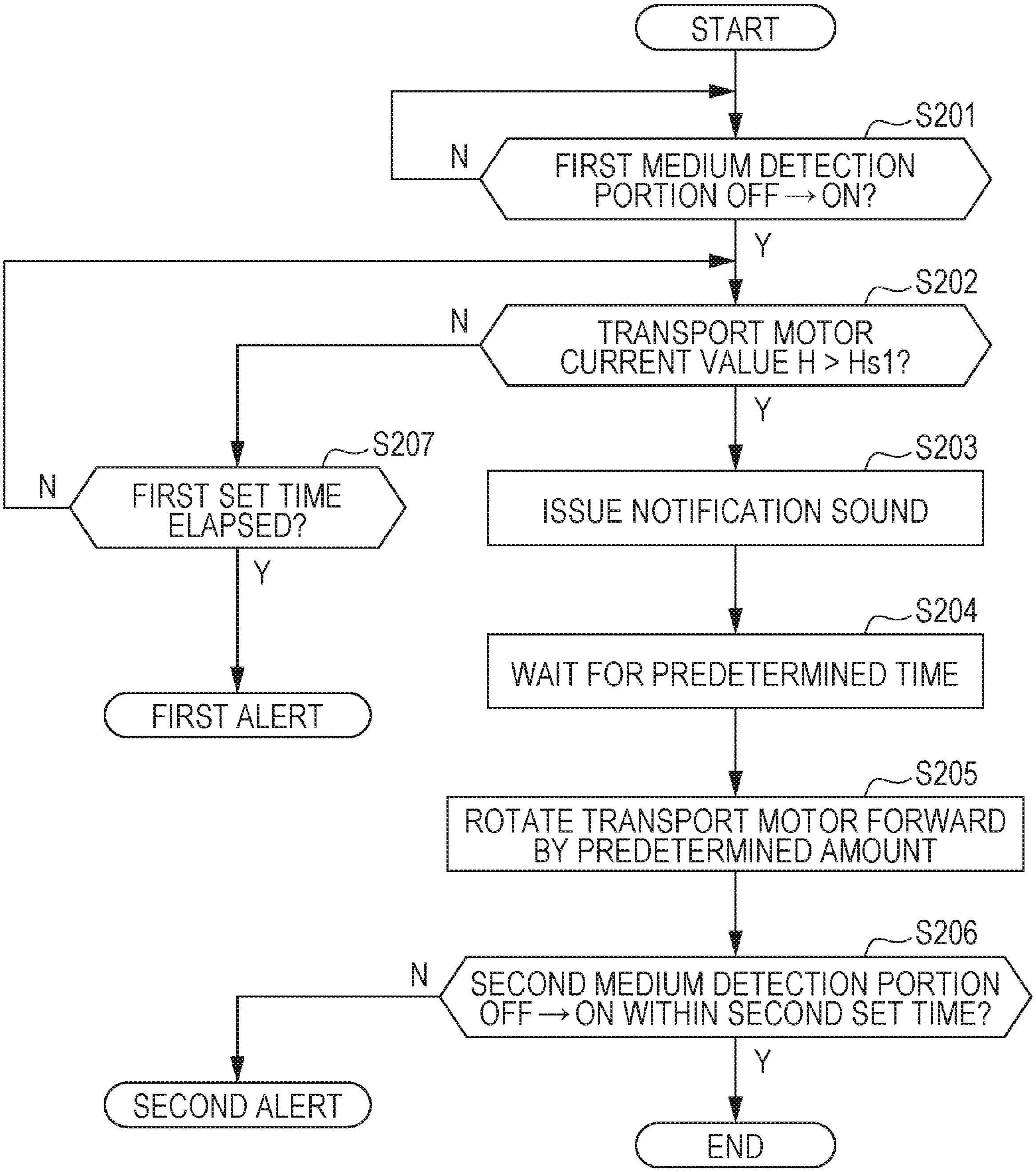
FIG. 8 is a flowchart of a second control example performed by the controller.

Next, FIG. 8 illustrates a second control example performed by the controller 50. In the second control example, the first medium detection portion 59 provided upstream of the feeding roller pair 15 is used.

First, when the first medium detection portion 59 detects the leading end Sf of the medium S ("Yes" in Step S201), the controller 50 determines whether the drive current value H of the transport motor 53 exceeds the threshold value Hs1 (Step S202). When the drive current value H of the transport motor 53 does not exceed the threshold value Hs1 ("No" in Step S202), the controller 50 determines whether the time that has elapsed from the first medium detection portion 59 detecting the leading end Sf of the medium S exceeds a predetermined first set time (Step S207). As a result, in a case in which the time that has elapsed exceeds the predetermined first set time ("Yes" in Step S207), the controller 50 causes the operation panel 6 to issue a first alert. The first alert in such a case can be, for example, an error message such as "Paper is not properly set. Reset the paper".

Next, when the drive current value H of the transport motor 53 exceeds the threshold value Hs1 ("Yes" in Step S202), the controller 50 emits a notification sound (Step S203). The notification sound is similar to the notification sound in Step S102 in FIG. 7.

Next, the controller 50 waits for a predetermined time (Step S204), and, thereafter, the controller 50 positions the medium S at the printing start position, by rotating the transport motor 53, that is, by rotating the feeding roller 15*a* forward by a predetermined amount (Step S205).

When the second medium detection portion 60 does not detect the leading end Sf of the medium S within the second set time ("No" in Step S206), the controller 50 causes the operation panel 6 to issue a second alert. The alert in such a case can be, for example, an error massage such as "Paper is jammed. Remove the jammed paper".

In a case of measuring the drive current value H varying in accordance with the drive load of the transport motor 53, for example, when the power of the printer 1 is turned on, the controller 50 performs measurement processing in which the relation between a rotation load applied to the transport motor 53 and the drive current value H is measured.

When a reference value H0 is a drive current value in a case of rotating the transport motor 53 in a standby state in which the medium S is not fed, the reference value H0 varies in accordance with various factors such as specific differences of the printer 1, operating environment of the printer 1, and degradation over time. For example, when the reference value H0 increases due to degradation of the apparatus over time, the difference between the reference value H0 and the threshold value Hs1 decreases, and erroneous detection may be caused when whether the leading end Sf of the medium S enters the feeding roller pair 15 is detected.

Thus, the controller 50 may obtain the reference value H0 by performing the measurement processing and may adjust the threshold value Hs1 based on the reference value H0. Other than when the power of the printer 1 is turned on as with the above-described case, the above-described measurement processing can also be performed when each recording job is performed or when a predetermined time has elapsed from the last measurement processing.

As described above, the medium feeding device 14 includes the feeding roller 15*a* that is provided in the medium feeding path T3 through which the medium S is fed and that feeds the medium S downstream by rotating in the forward direction in response to power from the transport motor 53. Based on an increase in the drive current value H, which is an example of the variation value varying in accordance with the drive load of the transport motor 53, the controller 50 controls the transport motor 53 and causes the feeding roller 15*a* to start the medium feeding operation.

Thus, it is possible to suppress the feeding operation from starting in a state in which a medium S setting error occurs. As a result, when a feeding anomaly occurs after the feeding operation of the medium S starts, it is possible to issue a user an appropriate alert. Thus, user convenience can be improved.

In addition, when detecting an increase in the drive current value H of the transport motor 53, the controller 50 emits a notification sound. Thus, due to the notification sound, the user can know that the medium S is nipped by the feeding roller pair 15, and user convenience is thereby improved.

In the second control example in FIG. 8, when the first medium detection portion 59 detects the leading end Sf of the medium S ("Yes" in Step S201), the controller 50 may counter-rotate the transport motor 53, that is, the feeding roller 15*a*, and, while continuing such counter-rotation, the controller 50 may monitor whether the drive current value H of the transport motor 53 exceeds the threshold value Hs1. Thus, an increase in the drive current value H becomes noticeable, and it is thereby possible to detect with greater certainty that the leading end Sf of the medium S is nipped by the feeding roller pair 15.

The rotational speed of the feeding roller 15*a* when the feeding roller 15*a* is rotated in the reverse direction may be lower than the rotational speed of the feeding roller 15*a* when the feeding roller 15*a* is rotated in the forward direction to feed the medium S. Thus, damage to the leading end Sf of the medium S when the leading end Sf enters the feeding roller pair 15 can be suppressed from being caused.

In addition, in the above-described second control example, when the controller 50 does not detect an increase in the drive current value H, even if a predetermined time has elapsed from the first medium detection portion 59 detecting passage of the leading end Sf of the medium S ("Yes" in Step S207 in FIG. 8), the controller 50 emits the first alert prompting insertion of the medium S. Thus, it is possible to encourage a user to take appropriate action, and, by extension, user convenience is improved.

In the above-described first control example and second control example, when detecting an increase in the drive current value H, the controller 50 may cause the adjustment mechanism 49 to widen the gap between the medium supporting portion 18 and the recording head 17. Thus, when a thick medium S is fed, it is possible to avoid the medium S rubbing against the recording head 17 and avoid damage to the recording head 17.

When the gap between the medium supporting portion 18 and the recording head 17 is widened, the gap may be widened to be the maximum gap or may alternatively be widened to be a gap that is narrower than the maximum gap but with which a predetermined level of safety is expected.

Instead of the above-described case, when the unit detection portion 61 detects detachment of the reverse unit 24 (refer to FIG. 3) from the apparatus main body 2, the controller 50 may also widen the gap between the medium supporting portion 18 and the recording head 17. In such a case, as with the above-described case, the gap between the medium supporting portion 18 and the recording head 17 may be widened to be the maximum gap or may alternatively be widened to be a gap that is narrower than the maximum gap but with which a predetermined level of safety is expected.

In addition, before the recording head 17 starts the recording operation, the controller 50 may also adjust the gap between the medium supporting portion 18 and the recording head 17 in accordance with the drive current value H. As described with reference to FIG. 6, because an amount of increase in the drive current value H varies in accordance with the thickness of the medium S, for example, after the gap between the medium supporting portion 18 and the recording head 17 is widened to be the maximum gap, the gap between the medium supporting portion 18 and the recording head 17 is reduced to match the thickness of the medium S based on the drive current value H. Thus, appropriate recording quality can be achieved.

The controller 50 may also adjust the recording quality in accordance with the thickness of the medium S grasped based on the drive current value H. For example, even if the type of the medium S that is obtained from the driver information is glossy paper and when the thickness of the medium S that is grasped based on the drive current value H corresponds to the thickness of plain paper, the recording quality may be adjusted to match the plain paper. Conversely, even if the type of the medium S that is obtained from the driver information is plain paper and when the thickness of the medium S that is grasped based on the drive current value H corresponds to the thickness of glossy paper, the recording quality may be adjusted to match the glossy paper. When the type of the medium S that is obtained from the driver information and the thickness of the medium S that is grasped based on the drive current value H do not match each other, instead of adjusting the recording quality, an alert to notice such circumstances may be displayed on the operation panel 6.

The present disclosure is not limited to the above-described exemplary embodiments, various modifications can be made within the scope of the disclosure as stated in the claims, and note that such modifications are included in the scope of the present disclosure.

What is claimed is:

1. A recording apparatus comprising:

a recording head configured to perform recording on a medium;

a medium supporting portion that is provided at a position facing the recording head and is configured to support a medium;

an adjustment mechanism that adjusts a gap between the recording head and the medium supporting portion;

an operation panel including a display portion; and a medium feeding device configured to feed a medium toward a region facing the recording head, the medium feeding device comprising:

a feeding roller that is provided in a medium feeding path through which the medium is fed and that feeds the medium downstream by rotating in a forward direction in response to power of a motor;

a nip roller that is provided in the medium feeding path and that nips the medium in cooperation with the feeding roller and rotates; and a controller configured to control the motor, wherein, in accordance with a variation value that varies in accordance with a drive load of the motor, before the recording head starts a recording operation, the controller controls the adjustment mechanism to adjust the gap, and wherein, when a type of the medium that is obtained from driver information and a thickness of the medium that is grasped based on a drive current value of the motor do not match each other, the controller displays an alert indicating non-match on the operation panel.

2. The recording apparatus according to claim 1, wherein when the variation value increases, the controller is configured, after the gap is widened to be a maximum gap, to reduce the gap to match a thickness of the medium based on a drive current value.

3. The recording apparatus according to claim 1, further comprising:

a passage detection portion for detecting passage of a leading edge of the medium is provided downstream of the feeding roller in the medium feeding path, wherein based on an increase in a fluctuation value, the controller controls the motor and executes a process of sending a leading end of the medium to a position downstream from the passage detection portion.

4. The recording apparatus according to claim 3, further comprising:

a medium detection portion that is provided upstream of the feeding roller in the medium feeding path and that detects passage of the medium, wherein when the medium detection portion detects passage of the leading end of the medium, the controller controls the motor to rotate the feeding roller in a reverse direction that is opposite to the forward direction, and when detecting an increase in the variation value with the feeding roller being rotated in the reverse direction, the controller changes a driving direction of the motor and starts a medium feeding operation.

5. The recording apparatus according to claim 4, wherein a rotational speed of the feeding roller when the feeding roller is rotated in the reverse direction is lower than the rotational speed of the feeding roller when the feeding roller is rotated in the forward direction in the medium feeding operation.

6. The recording apparatus according to claim 3, further comprising:

a medium detection portion that is provided upstream of the feeding roller in the medium feeding path and that detects passage of the medium, wherein when not detecting an increase in the variation value, even if a predetermined time elapses from the medium detection portion detecting passage of the leading end of the medium, the controller emits an alert prompting insertion of the medium.

7. The recording apparatus according to claim 1, wherein the variation value is the drive current value of the motor, the controller grasps the thickness of the medium based on the drive current value, and grasps the type of the medium based on the thickness, and adjusts a recording quality in accordance with the type.

* * * * *